United States Patent [19]

Kato

[11] Patent Number: 5,243,175
[45] Date of Patent: Sep. 7, 1993

[54] METHOD AND APPARATUS FOR DETERMINING THE VALIDITY OF DATA IN AN INTEGRATED CIRCUIT CARD

[75] Inventor: Akio Kato, Osaka, Japan

[73] Assignee: Minolta Camera Kabushiki Kaisha, Osaka, Japan

[21] Appl. No.: 333,913

[22] Filed: Apr. 6, 1989

[30] Foreign Application Priority Data

Apr. 8, 1988 [JP] Japan ................................. 63-87448

[51] Int. Cl.⁵ ...................... G06K 19/07; G06K 15/21
[52] U.S. Cl. ...................................... 235/435; 235/380; 235/492
[58] Field of Search ............... 235/375, 379, 380, 382, 235/382.5, 492, 487, 435

[56] References Cited

U.S. PATENT DOCUMENTS

| | | |
|---|---|---|
| 4,501,485 | 2/1985 | Tsudaka . |
| 4,614,861 | 9/1986 | Pavlov et al. ....................... 235/380 |
| 4,736,094 | 4/1988 | Yoshida ............................... 235/379 |
| 4,749,982 | 6/1988 | Rikuna et al. ....................... 235/380 |
| 4,764,789 | 8/1988 | Iwaki et al. . |
| 4,766,293 | 8/1988 | Boston ................................ 235/492 |
| 4,806,978 | 2/1989 | Nakatani et al. . |
| 4,808,802 | 2/1989 | Kano ................................... 235/380 |
| 4,959,788 | 9/1990 | Nagata et al. ....................... 235/379 |

Primary Examiner—Robert A. Weinhardt
Attorney, Agent, or Firm—Burns, Doane, Swecker & Mathis

[57] ABSTRACT

An improved IC card to be inserted in a data processing unit, for communicating data therewith includes: a memory for storing data having a validity term to be transferred to the data processing unit; a timer for determining whether specified time is within the term or not; and a data validity determining unit which does not transfer the data to the data processing unit when the data is not within the validity term. The memory stores not only the data having the term but also its validity term. Accordingly, data for control of the validity term of the data does not need to be prepared outside the IC card.

2 Claims, 9 Drawing Sheets

METHOD AND APPARATUS FOR DETERMINING THE VALIDITY OF DATA IN AN INTEGRATED CIRCUIT CARD

BACKGROUND OF THE INVENTION

1. Field of the Invention

The present invention relates to an integrated circuit (IC) card and a data control method therefor, for communicating data with a prescribed card processing unit. Particularly, the present invention relates to an IC card having a time measuring function and a data control method for the IC card.

2. Description of the Related Art

There have been proposed and provided IC cards for communicating data with a card processing unit (for writing/reading of data) to which such an IC card is connected.

Since such IC cards have large storage capacities compared with magnetic cards, they are expected to be used for various applications in future.

The applications for which IC cards are expected to be used are for example, ID cards, ticket cards, free pass cards, commuter tickets etc.

In the prior art, IC card calculators having a time indicating function (namely, a time measuring function) have been provided.

IC cards will be utilized in future for the purposes of controlling various factors such as specified terms.

For example, if IC cards are applied to the above mentioned ID cards, ticket cards, free pass cards and commuter tickets, they are valid only within specified periods and they cannot be used after termination of the periods (and before start of the periods).

Accordingly, if an IC card is utilized for the above mentioned applications (where validity of data is limited by a time period), determination as to whether the IC card is valid or not, that is, whether the card is within a validity term or not is required each time the card is used.

If a structure for effecting such determination is provided on the side of a reading unit, data to be controlled (data of validity terms etc.) for all the IC cards to be read by the reading unit need to be stored in a memory of the reading unit.

In order to store such data, it is necessary for the memory of the reading unit to have a large capacity and consequently the reading unit becomes expensive.

For example, if an IC card is used as a commuter ticket, all terminal units for checking commuter tickets at respective stations need to be connected on-line to a host computer, which involves a considerable difficulty.

SUMMARY OF THE INVENTION

Therefore, an object of the present invention is to make it easy to use an IC card for an application where validity of the card is limited by a time period or determination as to a term of validity is required.

Another object of the present invention is to omit a memory from a reading unit for the purpose of control of a term of validity of an IC card.

Still another object of the present invention is to make it easy to handle data to be secret in an IC card.

A further object of the present invention is to provide a data control method for an IC card, which can be used easily for an application where determination as to a term of validity is required.

In order to attain the above described objects, an IC card according to the present invention, connected to a data processing unit to communicate data with the data processing unit includes: a storing unit for storing first data to be transferred to the data processing unit and second data indicating a term of validity of the first data; a timer unit for measuring time; a determining unit for determining whether the present time is within the term indicated by the second data; and a forbidding unit forbidding transfer of the first data to the data processing unit when the determining unit determines that the present time is not within the term indicated by the second data.

Since the IC card is thus constructed, the term of validity of data stored in the IC card can be determined by the IC card itself. It is not necessary to prepare data for determination of the term of validity outside the IC card. Consequently, the IC card can be utilized easily for an application in which the validity of the card is limited by a time period.

According to another aspect of the invention, an IC card, which is connected to a data processing unit and transfers stored data to the data processing unit in response to a read instruction from the data processing unit, includes: a storing unit for storing first data to be transferred to the data processing unit and second data indicating a term of validity of the first data; a timer unit for measuring time; a determining unit responsive to the read instruction, for determining whether the present time is within the term indicated by the second data or not; and a forbidding unit for forbidding transfer of the first data to the data processing unit when the determining unit determines that the present time is not within the term indicated by the second data.

Since the IC card is thus constructed, it is not necessary for a reading unit to have data for determining the term of validity of the IC card. Consequently, in the IC card, a memory does not need to be provided in a data reading unit for the purpose of storing data for control of the term of validity of the IC card.

According to a further aspect of the invention, an IC card, which is connected to a data processing unit and transfers stored data to the data processing unit in response to a read instruction from the data processing unit, includes: a storing unit for storing first data to be transferred to the data processing unit and second data indicating a term of validity of the first data; a time measuring unit for measuring time; a determining unit responsive to the read instruction, for determining whether or not the present time is within the term indicated by the second data; and an erasing unit for erasing the first data in the storing unit when the determining unit determines that the present time is not within the term indicated by the second data.

Since the the IC card is thus constructed, the data not corresponding to the term of validity is not stored and it is erased. In consequence, it becomes easy to handle data to be secret in the IC card.

According to a preferred embodiment of the present invention, a data processing method in an IC card connected to a data processing unit and having a timer unit for transferring stored data to the data processing unit in response to a read instruction from the data processing unit, includes the steps of: storing first data to be transferred to the data processing unit and second data indicating a term of validity of the first data; generating a time signal from the timer unit in response to the read instruction; determining whether or not time specified by the time signal is within the term indicated by the second data; and forbidding transfer of the first data to the data processing unit when the time is not within the term indicated by the second data.

Since the data control method for the IC card includes the above indicated steps, the term of validity of the data stored in the IC card can be determined by the IC card itself. Accordingly, the method does not include the step of preparing data for controlling the term of validity of the data outside the IC card. In consequence, it becomes easy to use the control method for the IC card for an application in which determination of a term of validity is required.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention will be described.

An IC card according to the embodiment has a thin rectangular shape (the shape of a card) and it includes a connection terminal for a card processing unit, on its oneside to be inserted in the card processing unit. Since the IC card and the card processing unit (a unit for writing or reading data into or from the IC card) have well-known appearances, illustration thereof is omitted.

Figure 1:
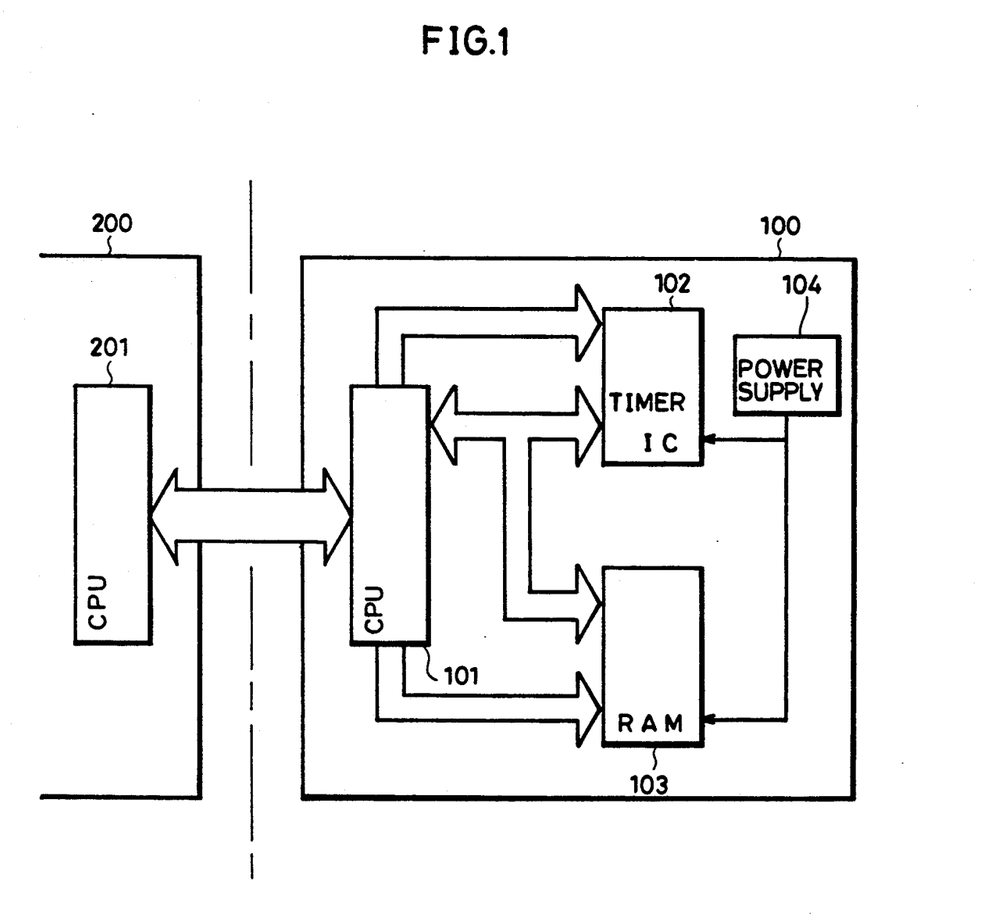
FIG. 1 is a block diagram showing an electric construction of an IC card according to an embodiment of the invention.

FIG. 1 is a block diagram showing an electric construction of an IC card 100 of the embodiment and a card processing unit 200 to which the IC card 100 is connected.

As shown in the figure, the IC card 100 includes a control CPU 101, a timer IC 102, and a RAM 103. The timer IC 102 and the RAM 103 are backed up constantly by a power supply 104. Those components are interconnected by a bus.

When the IC card 100 is connected to the card processing unit 200 (the connection is made when the IC card is inserted into an opening of the card processing unit), the control CPU 101 is connected to a control CPU 201 of the card processing unit 200 through a bus, so that data is communicated.

Figure 2:
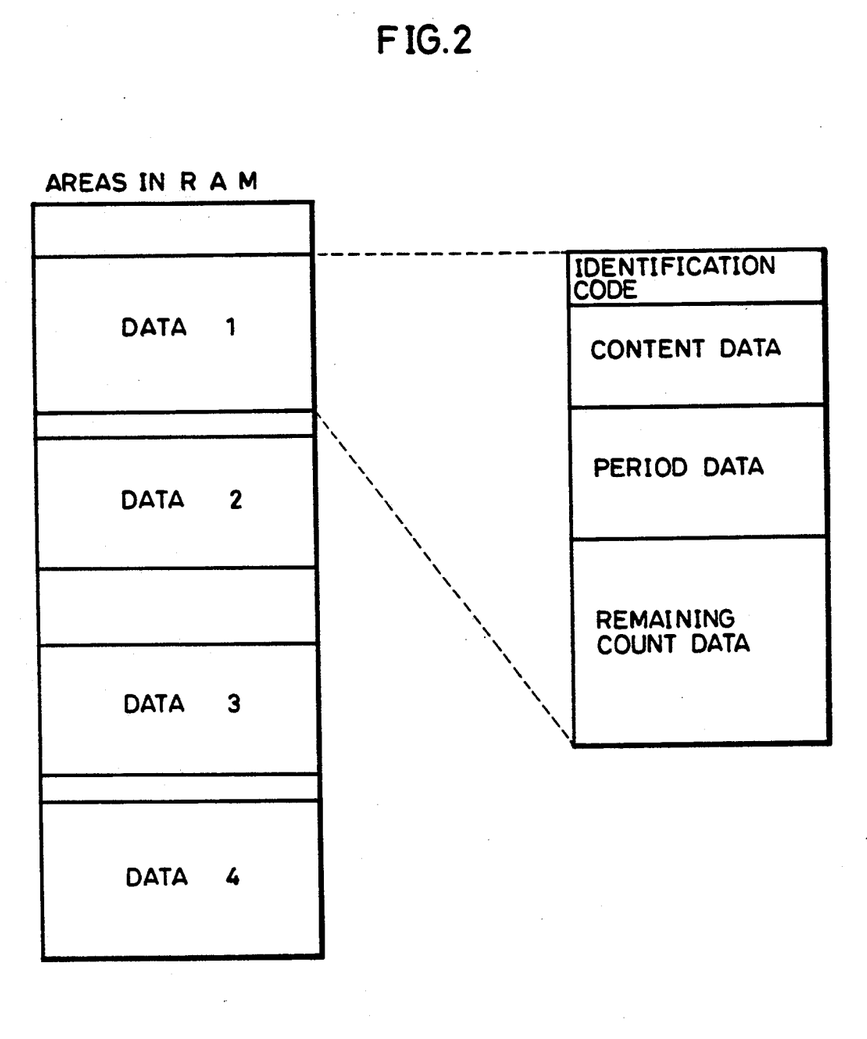
FIG. 2 is a memory map showing a configuration of a memory of an IC card according to the present invention.

FIG. 2 is a memory map showing a configuration of the RAM 103.

As shown in FIG. 2, the RAM 103 is divided into a plurality of memory areas and different data are stored in the respective areas.

The data stored include for example identification code data, content data, term data and remaining count data.

The following table indicates an example of combination of types and formations of the data.

TABLE

|  | data 1 | data 2 | data 3 | data 4 |
| --- | --- | --- | --- | --- |
| identification code | transportation A | transportation B | movie theater C | department store D |
| content data | commuter ticket from station a to station b | coupon ticket from station c to station d | special invitation ticket | 10% discount ticket |
| term of validity | Jan. 3, '88 to April 2, '88 | Feb. 1, '88 to ~ | Feb. 4, '88 to May 3, '88 | March 7, '88 to March 6, '89 |
| remaining count | — | 7 | 5 | — |

Thus, according to this example, data of a commuter ticket of a transportation A is stored as data 1; data of a coupon ticket of a transportation B is stored as data 2; data of a special invitation ticket of a movie theater C is stored as data 3; and data of a 10% discount ticket of a department store D is stored as data 4.

The data 1, 3, and 4 each have a term of validity and the data 2 and 3 each have remaining count data.

Control operations for reading data from the IC card which stores data groups as described above, and for forbidding the reading are executed in the below described manner.

Figure 3:
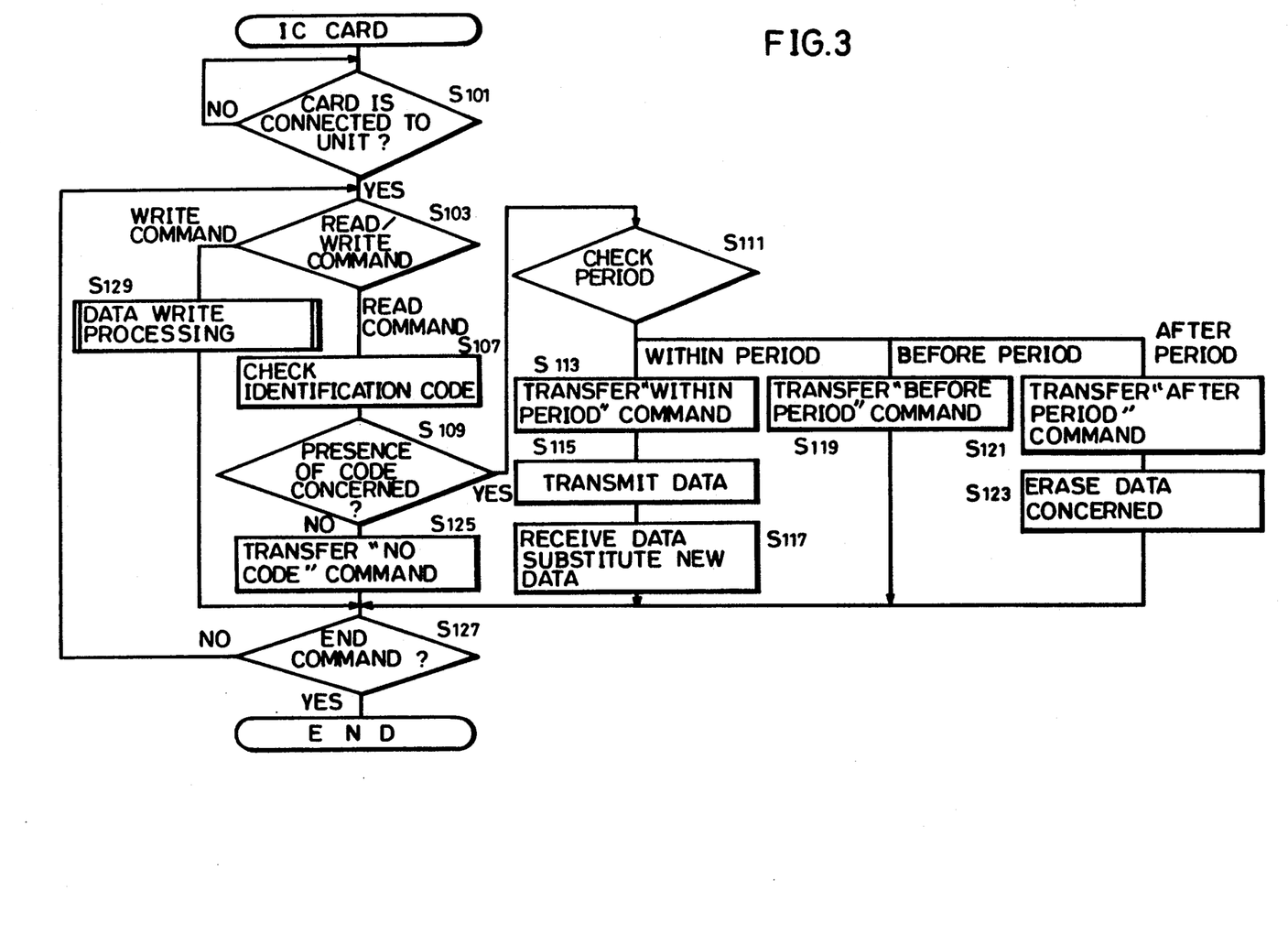
FIG. 3 is a flow chart for explaining write/read processing in a control CPU of an IC card according to the present invention.

FIG. 3 is a flow chart for explaining data write/read processing in the IC card 100.

The CPU 101 is in a waiting state for data read/write processing until the IC card 100 is connected to the card processing unit 200 (S101: NO).

When the connection between the IC card 100 and the card processing unit 200 is detected in step S101 (YES), the waiting state is canceled and the processing flow proceeds to step S103.

In step S103, a command transferred from the control CPU 201 of the card processing unit 200 (as shown in S203 in FIG. 4) is determined.

If the command is determined to be a write command in step S103, the processing flow proceeds to step S129, so that data write processing is executed. Since the data write processing does not have direct relation with the characteristic feature of the present invention, the description thereof is omitted.

On the other hand, if the command is determined to be a read command in step S103, the processing flow proceeds to step S107.

In step S107, a data identification code (as shown in S207 in FIG. 4) transferred from the CPU 201 is checked with identification codes of the data groups (as shown in FIG. 2) stored in the RAM 103 of the IC card 100.

In step S109, a branch in processing takes place according to the result of the checking in S107.

Figure 4:
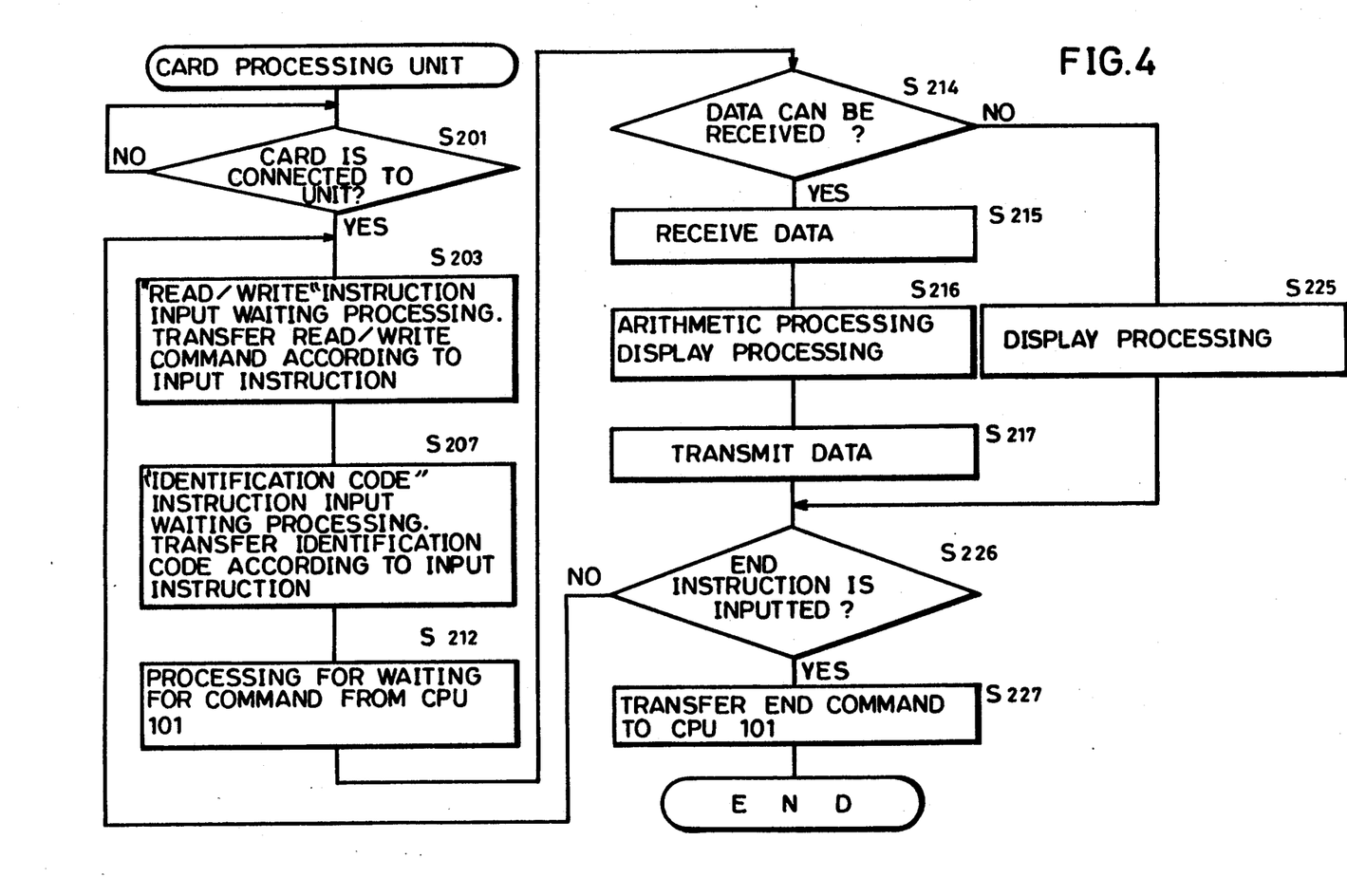
FIG. 4 is a flow chart for explaining processing in a control CPU of a card processing unit to which an IC card according to the present invention is connected.

If it is determined according to the result of the checking in S107 that there is no identification code stored in the RAM 103 corresponding to the received identification code (NO in S109), a command "no corresponding code" is transmitted to the CPU 201 (in step S125; see S212 in FIG. 4).

On the other hand, if it is determined according to the result of the checking in S107 that an identification code corresponding to the received identification code is stored in the RAM 103 (YES in S109), the processing flow proceeds to step S111.

In step S111, period data (as shown in FIG. 2) of the data defined by the identification code is checked.

If it is determined as the result of the checking in step S111 that the present time is within a period enabling the data to be read, the processing flow proceeds to step S113 and a command "within the period" is transmitted to the CPU 201. After that, the content of the data (for example, content data or remaining count data as shown in FIG. 2) is transmitted (in S115; see S215 in FIG. 4). Then, new data is received from the CPU 201 (in S117; see S217 in FIG. 4), so that the new data is substituted for old data. For example, old count data is replaced by renewed data (decremented data).

On the other hand, if it is determined as the result of the checking in step S111 that the present time is before the period enabling the data to be read, a command "before the period" is transmitted to the CPU 201 (in S119).

If it is determined as the result of the checking in step S111 that the present time is already after termination of the period enabling the data to be read, the processing flow proceeds to step S121 and a command "lapse of the period" is transmitted to the CPU 201 and the data for which the period has lapsed is erased from the RAM 103 (in S123).

The processing flow proceeds to step S127 from the respective steps S117, S119, S123 and S125.

In step S127, it is determined whether the read/write processing is terminated, based on determination as to whether an end command is transmitted from the CPU 201 (see S227 in FIG. 4).

If the receipt of the end command is detected as the result of the determination in step S127, the read/write processing in the CPU 101 is terminated and there is a wait for read/write processing until the IC card 100 is inserted into the card processing unit 200 next time.

On the other hand, if receipt of the end command is not detected according to the result of the determination in step S127, the processing flow returns to step S103 and there is a wait for receipt of the next read/write command (as shown in S203 in FIG. 4). After the receipt, write processing or read processing is executed according to the command.

FIG. 4 is a flow chart for explaining write/read processing in the card processing unit 200 into which the IC card according to the embodiment of the invention is inserted.

The CPU 201 is in a waiting state for read/write processing until the IC card 100 is connected to the card processing unit 200 (NO in step 201).

If the connection between the card processing unit 200 and the IC card 100 is detected in step S201 (YES in S201), the waiting state for read/write processing is cancelled and the processing flow proceeds to step S203.

In step S203, processing for waiting for a "read instruction" or a "write instruction" from an external input means or the like, not shown, is executed. When the "read instruction" or the "write instruction" is inputted, a "read command" or a "write command" is transferred to the CPU 101 of the IC card 100 according to the inputted instruction signal (see S103 in FIG. 3).

In step S207, processing for waiting for an "identification code instruction" for specifying data to be read from the external input means or the like not shown, is executed and when the "identification code instruction" is inputted, an "identification code" corresponding to the specified data is transferred to the CPU 101 of the IC card 100 (see S107 in FIG. 3).

In step S212, processing for waiting for a command transmitted from the CPU 101 is executed. The command includes commands "within the period", "before the period", "lapse of the period", "no code", "unavailable", "available" etc.

In step S214, processing for determining the received command is executed.

If it is determined as the result of the determination in S214 that the command is the command "within the period" or "available", the processing flow proceeds to step S215, whereby the data is received (see S115 in FIG. 3). Based on the received data, arithmetic processing and display processing are executed (in S216). The arithmetic processing is for example processing for decrementing the count data. The display processing is for example processing for displaying the decremented count. Further, data obtained by the arithmetic processing and the like is transmitted to the CPU 101 (in S217; see S117 in FIG. 3).

On the other hand, it is determined as the result of the determination in S214 that the command is any of the commands "before the period", "lapse of the period", "no code" and "unavailable", the processing flow proceeds to step S225, whereby display processing of the command is executed.

The processing flow proceeds to step S226 from the step S217 or S225.

In step S226, it is determined whether an end of the read/write processing is instructed (by means of the external input means not shown).

If the end instruction of the read/write processing is detected as the result of the determination in S226, the processing flow proceeds to step S227, so that the "end command" is transmitted to the CPU 101 (see S127 in FIG. 3). When the end instruction signal is inputted, the CPU which controls an actuator of the card processing unit 200 executes processing for ejecting the IC card 100 to outside.

On the other hand, if the end instruction of the read/write processing is not detected as the result of the determination in S226, the processing flow proceeds to step S203. The card processing unit waits for input of the next "read instruction" or "write instruction".

As described above, communication (write/read) of data between the IC card 100 and the card processing unit 200 is executed.

FIGS. 5 to 9 are flow charts showing examples for executing read/write processing in the IC card 100 by using methods different from that shown in FIG. 3.

In the following, each example will be described.

Figure 5:
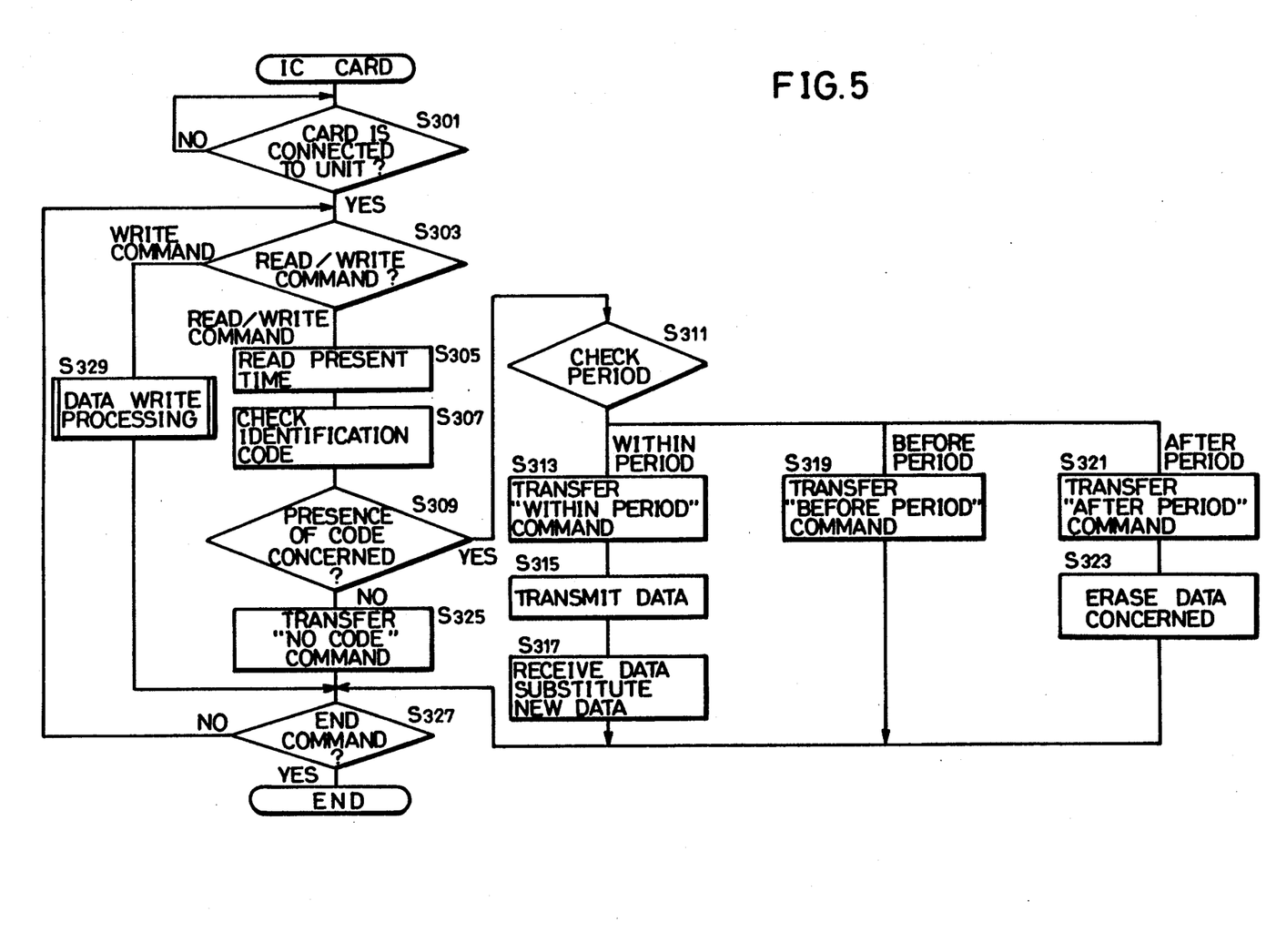
FIG. 5 is an exemplary flow chart of write/read processing in a control CPU of an IC card according to the present invention.

(1) FIG. 5

This example is different from the processing of FIG. 3 in that a step S305 is added to the procedures of steps S103 to S107 of FIG. 3.

More specifically, in the processing of FIG. 3, the "period checking processing" in step S111 is executed by using as a reference the time at which data to be read is specified by an identification code (in S107 and S109; see S207 in FIG. 4).

By contrast, in the processing of FIG. 5, the time at which the read/command is received (in S203 of FIG. 4, and S103) is stored (S305), so that the "period checking processing" in step S311 (S111) is executed by using as a reference the time at which the read command is received.

Similarly, the time at which the IC card 100 is inserted into the card processing unit 200 may be stored and the "period checking processing" may be executed by using that time as a reference point.

Thus, the processing shown in FIG. 5 makes it possible to prevent the time from being terminated due to a delay in operation.

Figure 6:
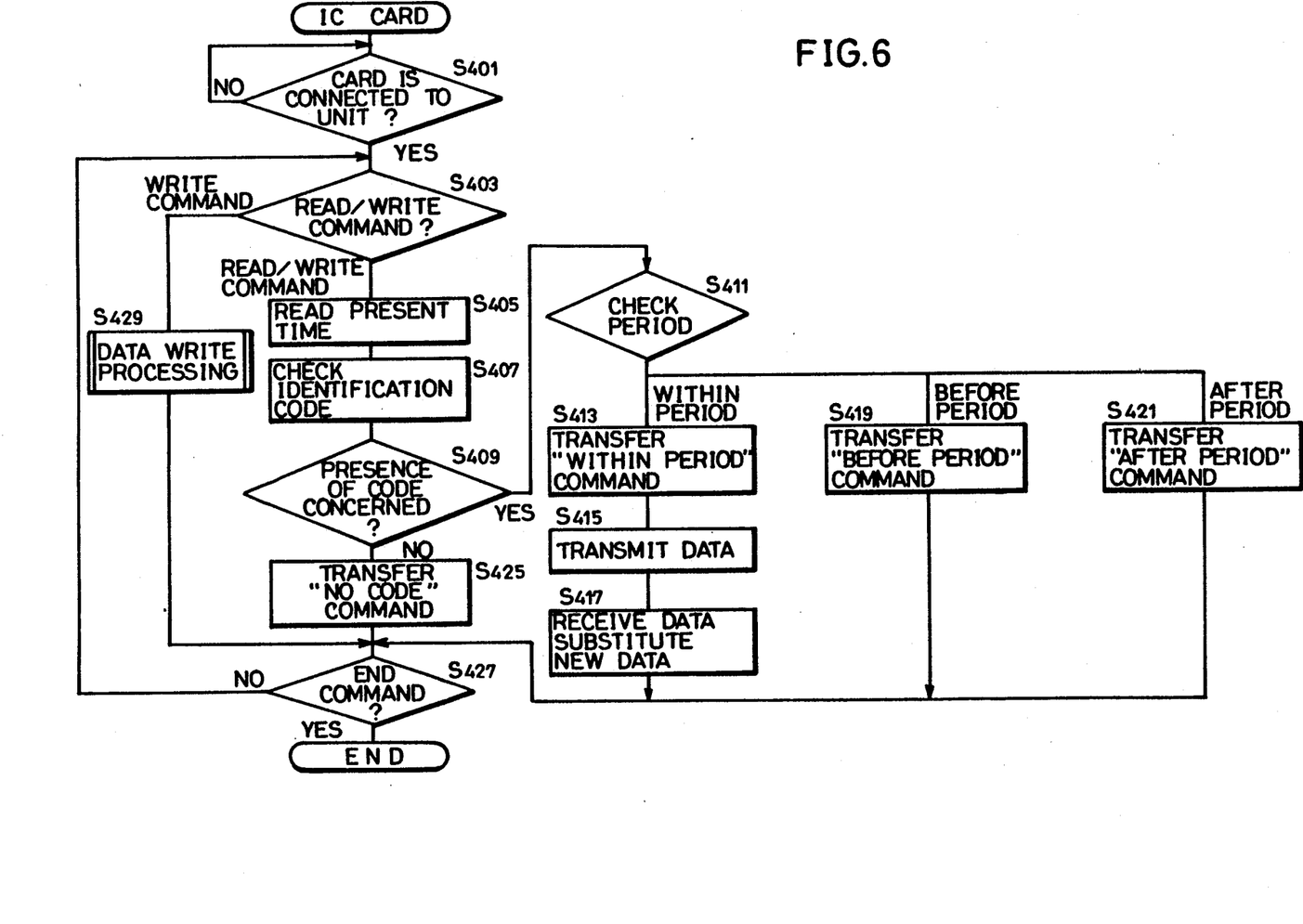
FIG. 6 is another exemplary flow chart of write/read processing in a control CPU of an IC card according to the present invention.

(2) FIG. 6

The processing in FIG. 6 is different from that in FIG. 5 in that the step S323 or S123 in FIG. 3 concerning the data erasing processing is omitted.

Thus, the data of the time terminated is stored. Accordingly, when data of the same type is written next time, it can be determined whether this data is new data or the data stored till then. Consequently, old data can be utilized in various manners.

Figure 7:
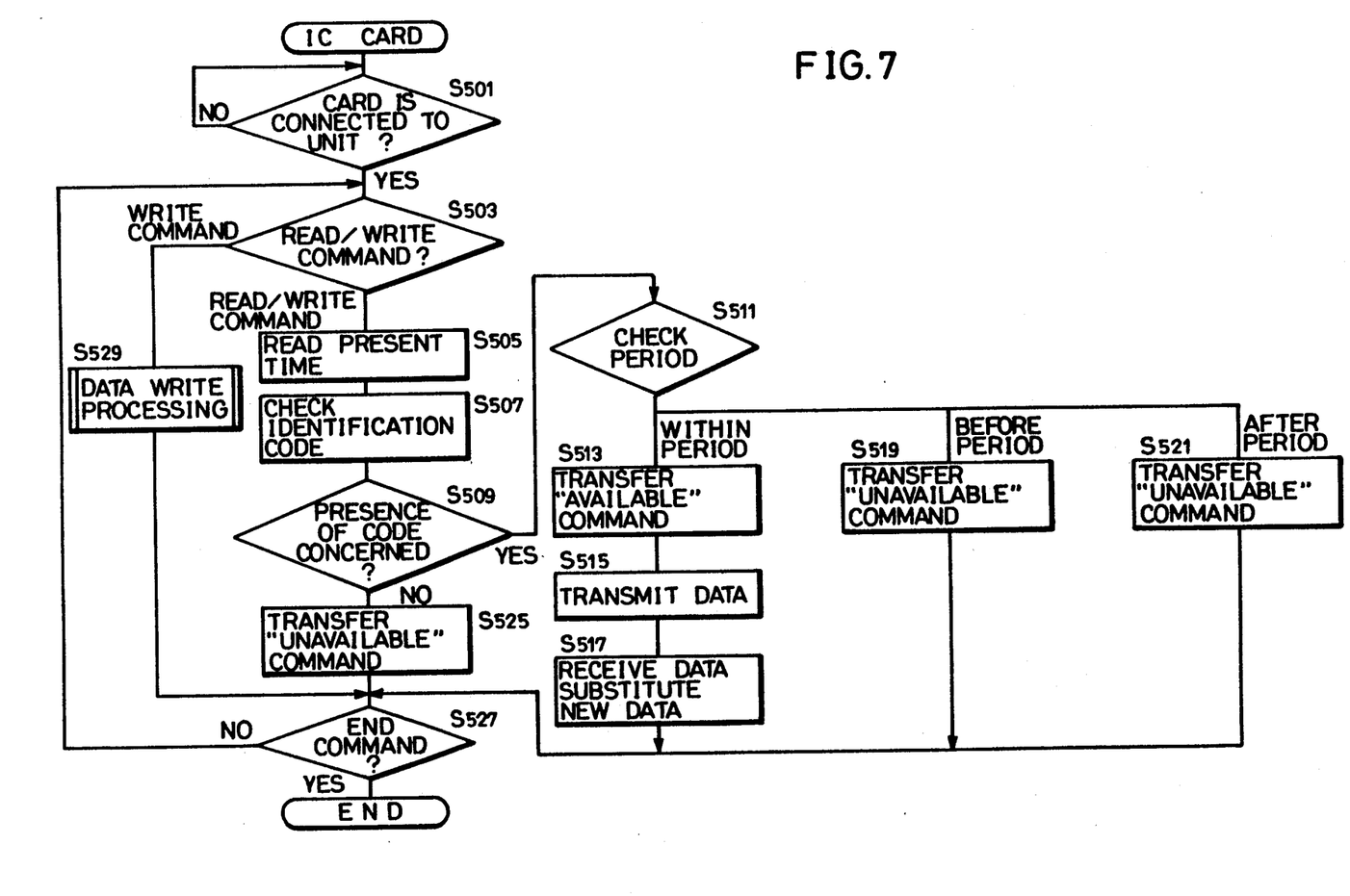
FIG. 7 is another exemplary flow chart of write/read processing in a control CPU of an IC card according to the present invention.

(3) FIG. 7

This processing is different from the processing in FIG. 6 in that the command "unavailable" is transmitted in steps S519, S521 and S525 and that the command "available" is transmitted in step S513. The steps S519, S521, S525 and S513 correspond to the steps S119, S121, S125 and S113 in FIG. 3, respectively, and correspond to the steps S419, S421, S425 and S413 in FIG. 6, respectively.

Thus, only "unavailable" for example is displayed on the display portion of the card processing unit 200. The reason for the unavailable state is not displayed. Accordingly, this display method is useful for cases in which data should be secret.

Figure 8:
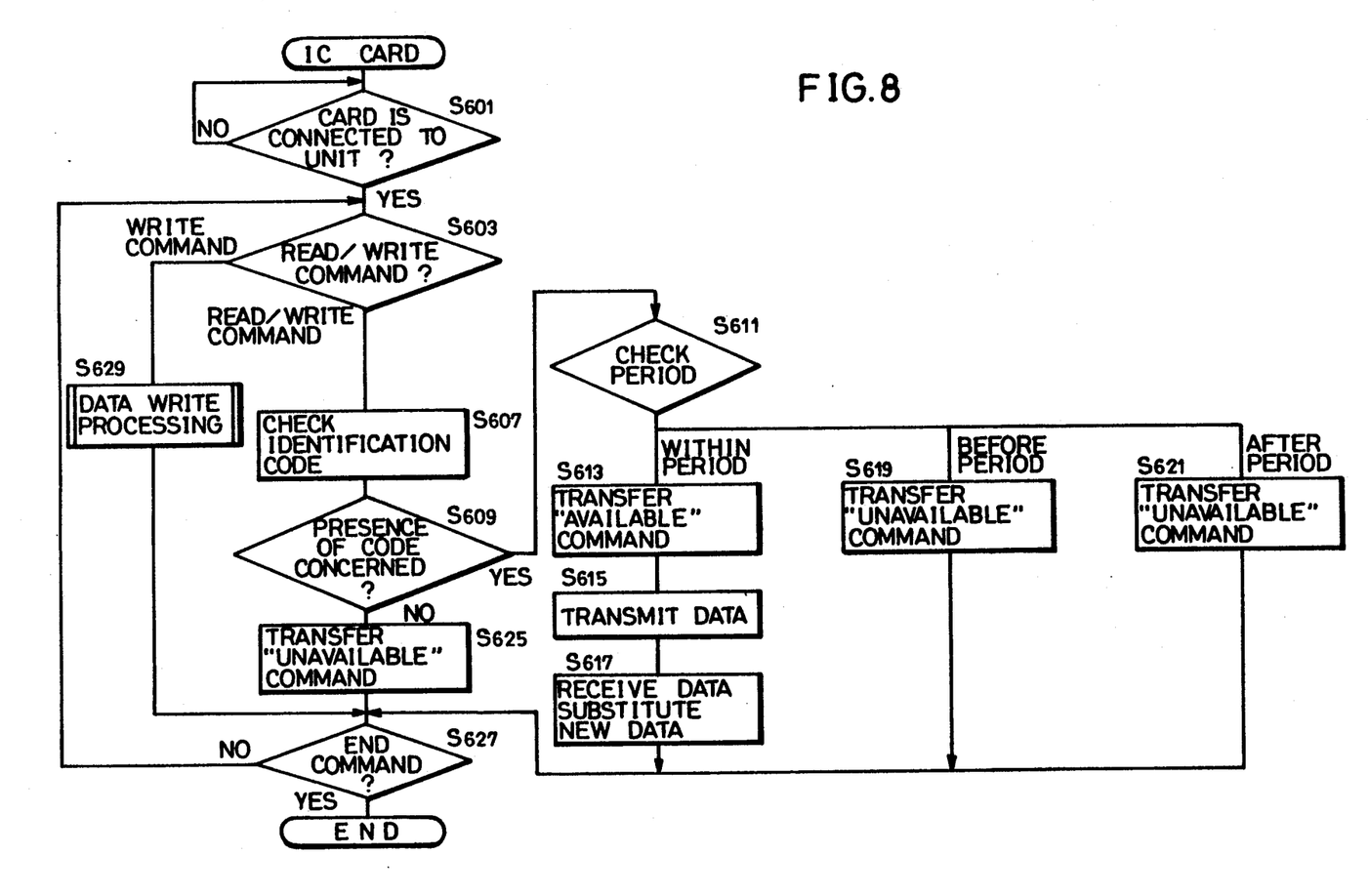
FIG. 8 is another exemplary flow chart of write/read processing in a control CPU of an IC card according to the present invention.

(4) FIG. 8

In the processing in FIG. 8, the step S505 in FIG. 7 (related with the present time reading processing) is omitted. The processing in FIG. 8 is different from the processing in FIG. 3 in that the command "unavailable" or the command "available" is transmitted in steps S119, S121, S125 and S113 (in steps S619, S621, S625, S613).

Thus, nearly the same effect as in the case of FIG. 7 can be obtained.

Figure 9:
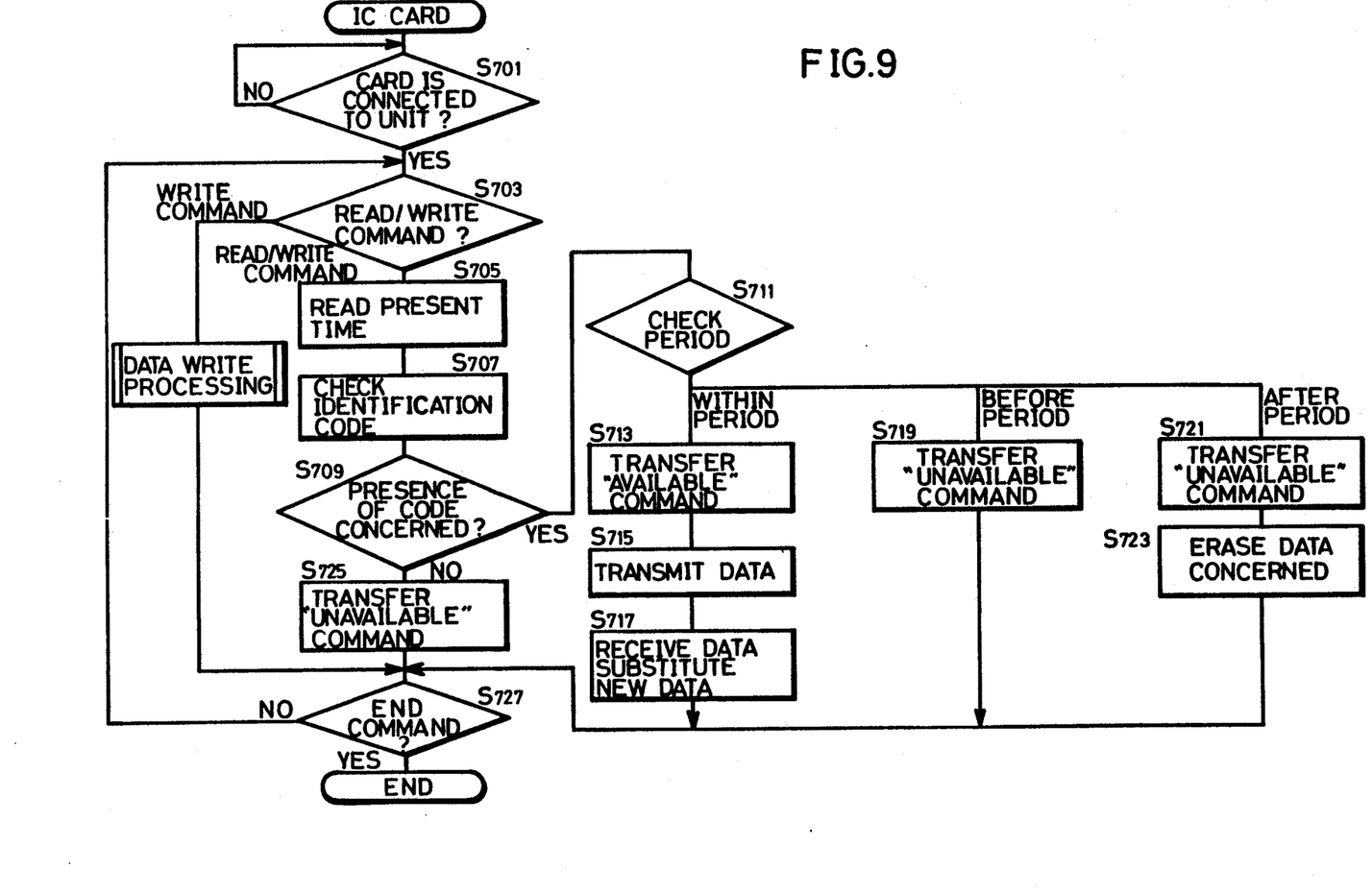
FIG. 9 is another exemplary flow chart of right/read processing in a control CPU of an IC card according to the present invention.

(5) FIG. 9

In the processing in FIG. 9, a step S723 (related with corresponding data erasing processing) is added after the step S521 in the processing in FIG. 7.

The addition of the above mentioned step makes it possible to utilize the IC card more effectively in cases in which data should be secret.

In the above described embodiment, the period data is checked by the CPU 101 in the IC card 100. It may be checked by the CPU in the card processing unit 200 in which the IC card 100 is inserted.

As described in the foregoing, according to the present invention, the IC card for communicating data with a card processing unit to which the card is connected comprises a memory, a timer, a determination unit for determining whether the present time is the time enabling the data to be read, a forbidding unit for forbidding the reading of the data if the present time is the time for bidding the reading of the data. Further, data for which the period of validity has passed is erased as required. Consequently, according to the present invention, even if reading of data is instructed, the reading is not executed if the data is not within the period enabling the reading.

Accordingly, the IC card can be utilized not only for applications in which data having a term of validity is handled, but also for applications in which data to be maintained secret until a prescribed time is stored.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An IC card to be connected to a data processing unit, for communicating data with said data processing unit comprising:
    storing means for storing a plurality of first data to be transferred to said data processing unit and a plurality of second data corresponding to said first data, each of said second data indicating a term of validity of said corresponding first data;
    timer means for generating present time data;
    determining means which compares said present time data with said second data and determines whether said first data is valid or invalid; and
    erasing means for erasing first data determined invalid by said determining means from said storing means and maintaining remaining first data.

2. An IC card to be connected to a data processing unit, for transferring stored data to said data processing unit in response to a read instruction from said data processing unit, comprising:
    storing means for storing a plurality of first data to be transferred to said data processing unit and a plurality of second data corresponding to said first data, each of said second data indicating a term of validity of corresponding first data;
    timer means for generating present time data;
    detecting means for detecting whether said IC card is connected to the data processing unit;
    identifying means for identifying any of said plurality of first data which is requested by said read instruction from said data processing unit;
    determining means for determining whether the present time data is within the term of validity indicated by second data corresponding to the identified first data;
    erasing means for erasing said identified first data from said storing means without erasing remaining first data which is not identified when said determining means determines that the present time data is not within the term of validity indicated by said second data corresponding to said identified first data; and
    control means responsive to said detecting means for enabling said identifying means, determining means and erasing means when said IC card is connected to the data processing unit and inhibiting said identifying means, determining means and erasing means when said IC card is not connected to the data processing unit.

* * * * *